United States Patent [19]

McGee

[11] Patent Number: 5,538,183

[45] Date of Patent: Jul. 23, 1996

[54] VEHICLE TRACTION MAT

[76] Inventor: John D. McGee, 521 Park St., Laurel, Miss. 39440

[21] Appl. No.: 453,243

[22] Filed: May 30, 1995

[51] Int. Cl.⁶ .................................................. E01B 23/00
[52] U.S. Cl. ............................................................. 238/14
[58] Field of Search ................................ 238/14; 180/313

[56] References Cited

U.S. PATENT DOCUMENTS

| | | |
|---|---|---|
| 1,373,042 | 3/1921 | Workman . |
| 1,732,975 | 6/1928 | Lindner . |
| 2,479,760 | 8/1949 | Merrick ................................ 238/14 |
| 2,486,911 | 11/1949 | Becker ................................. 238/14 |
| 3,672,422 | 6/1972 | Greipel ................................ 238/14 |
| 3,701,474 | 10/1972 | Welz .................................... 238/14 |
| 4,133,481 | 1/1979 | Bennett ............................... 238/14 |
| 4,223,835 | 9/1980 | Witt et al. ............................ 238/14 |
| 4,650,115 | 3/1987 | Fontaine ............................. 238/14 |
| 4,840,309 | 6/1989 | Teresi ................................. 238/14 |
| 4,998,670 | 3/1991 | Peterson ............................. 238/14 |
| 5,100,054 | 3/1992 | Fickett et al. ...................... 238/14 |

*Primary Examiner*—S. Joseph Morano
*Attorney, Agent, or Firm*—David L. Baker; Rhodes & Ascolillo

[57] ABSTRACT

The invention consists of a plurality of hinged panels including side rails where the panels on each end are shorter in length than the panels between them. The panel on one end is shorter in length than the panel on the other end. Both end panels are tapered in thickness and in with. The top surface is covered with projects forming rectangular cavities with the top of the long sides higher at the ends than in the mid-section. The bottom surface includes fasteners for removably attaching cleats for gripping slippery surfaces. A variety of cleats are proposed for securing the mat under different conditions. Bracing arms are provided to support the mat in an upright position when it is used as a highway warning marker. The mat is brightly colored for daytime use and the side rails and bracing arms are covered with light reflective material for use during the hours of darkness. The panels are so hinged that one half will fold over the remaining half without interference for storage.

4 Claims, 7 Drawing Sheets

VEHICLE TRACTION MAT

BACKGROUND OF THE INVENTION

1. Field of the Invention

This invention relates generally to mats for use under the wheels of land vehicles and in particular to mats that provide increased traction on slippery surfaces such as ice, snow, and unconsolidated soils.

2. Description of the Prior Art

U.S. Pat. No. 1,373,042 issued Mar. 29, 1921 to A. G. Workman discloses a mud shoe for a motor vehicle that includes surface engaging cleats on one side and tire engaging cleats on the other side. A plurality of body sections are connected and are formed in the general shape of the transverse cross section of the vehicle tire.

U.S. Pat. No. 1,732,975 issued Oct. 22, 1929 to T. Lindner for a vehicle extraction device. The invention consists of a plurality of hinged plates that include spikes for engaging the earth surface. The top surface is knurled to provide added traction for the tire. The foremost section is narrower than the trailing plates in order to better slip under the tire of the mired vehicle.

U.S. Pat. No. 2,479,760 issued Aug. 23, 1949 to G. H. Merrick for a vehicle traction device. The invention is another articulated mat for use under the wheels of a mired motor vehicle and consists of a plurality of plates containing a series of transverse and longitudinal rib on the tire receiving surface and a plurality of spikes on the ground engaging surface.

U.S. Pat. No. 4,133,481 issued Jan. 9, 1979 to L. B. Bennett, shows a traction mat made of molded thermoplastic material. The mat has a generally rectangular frame with a central traction area bounded on each side by an integrally joined approach. The traction area, occupying approximately one half of the mat's surface area, is made up of T-shaped bars arranged at approximately 45 degree angles to the sides of the frame and intersecting each other at right angles such as to form a grid-like arrangement.

U.S. Pat. No. 4,223,835 issued Sep. 23, 1980 to Witt et al. for a rectangular traction pad. The pad is wedged shaped on one end and contains projections on the upper and lower planar surfaces to provide regions of traction from the mat to the ground surface and from the mat to the vehicle tire.

U.S. Pat. No. 4,650,115, issued Mar. 17, 1987 to Serge Fontaine, provides a mat having a generally flat body with ground-gripping cleats which are axially movable relative to the body. Cleat movement, between inoperative and operative positions, occurs in response to a vehicle wheel moving over the body's upper surface. The body itself is formed of a complex arrangement of parallel rows of individual elements each retaining a single cleat-moving assembly and joined by a number of transverse rods.

U.S. Pat. No. 4,840,309 issued Jun. 20, 1989 to Baspare Teresi, describes a traction mat having a planar rubber member with integrally molded downwardly extending cleats for engaging the ground surface and an upper layer of carpet for frictional engagement with the vehicle wheel. A retractable handle is dispose within the rubber member for assisting the user in positioning the mat.

U.S. Pat. No. 4,998,670 issued Mar. 12, 1991 to Francis N. Pererson, teaches the use of a ribbed, flexible, vinyl-like strip studded at regular intervals with cleats in the shape of metal cups. The cleats are joined in pairs by means of a securing rivet passing through their respective centers on opposing sides of the strip.

U.S. Pat. No. 5,100,054, issued Mar. 31, 1992 to Richard C. Fickett et al., discloses a vehicle traction assist device stamped from a generally rectangular piece of cold-rolled steel plate. Spaced apertures are punched from the plate to provide crossbars that are given a 90 degree twist to provide a central blade portion for engagement with both the vehicle wheel and underlying ground surface. Additional, downwardly extending teeth projecting from the sides of the device are shaped to form cleats for added traction and engagement with the underlying ground.

The references cited, taken alone or in combination, fail to anticipate the invention as disclosed and claimed herein.

SUMMARY OF THE INVENTION

Various devices have been developed for improving traction between the wheels of a land vehicle and a road surface made slippery by adverse weather of inferior roadbed conditions Many of the more practical devices are in the form of a generally flat body for positioning against, and partially beneath, the vehicle wheel such that a non-skid surface or ramp is formed upon which the wheel may extricate itself by powered rotation. The flat body is normally provided with a gripping surface on its top side for generating significant frictional forces when brought into contact with the external surface of the vehicle wheel. The bottom side of the mat is similarly given gripping means, such as cleats, for holding fast to snow, ice or any other slick roadway surface thereby providing traction where none would otherwise be available. One of the identified problems associated with prior art traction mats is that they are often difficult to position beneath the vehicle's wheels for use. In many cases, the wheels of a vehicle will become mired in snow or mud for some depth. The resulting ruts formed by the vehicle wheels as they sink into the mire are frequently steeply sloping and deep. When a prior art traction mat is employed to extricate the vehicle from such an environment, the wheel will frequently engage and slide against the leading or front edge of the mat without gaining a satisfactory grip because of the mat's rigid overall structure which prevents it from being moved sufficiently into the angled juncture between the wheel and the slippery surface. Attempts to overcome this problem by forming mats from highly flexible material have proven unsatisfactory in that they tend to conform too closely to the steeply sloping walls of the rut or furrow, making it all but impossible for the vehicle to climb out under its own power.

In addition, the mat is formed of a bright attention attracting color such as international orange or yellow which when combined with a highly reflective strip of material attached to the side rail of the mat may be effectively used as a hazard warning panel. Included are a pair of lateral supports which allow the panel to be placed upright where it may be seen and still withstand the wind and vibration from passing traffic in a highway situation.

The invention is primarily directed to a device for solving the problem of the vehicle mired in snow, mud or sand by providing an improved traction mat which has a body formed from a plurality of relatively, large, pivotally joined segments which will ensure proper positioning beneath the wheel et provide a gradually sloping ramp upon which the wheel may ride to extricate itself. The invention is characterized particularly by removable ground engaging cleats that will allow the appropriate cleats to be affixed depending upon whether the application is snow, mud or sand.

3

Accordingly, it is a principal object of the invention to provide a novel land vehicle traction mat that has a substantially rectangular body formed from a single row of pivotally joined segments for providing the body with articulated adjustability for ready positioning within the angled juncture between wheel and slick surface.

It is another object of the invention to provide a traction mat with a hinge mechanism for pivotally joining its body segments, the hinge mechanism permitting the mat to be folded to one half of its extended length for compact storage and easy transport.

It is a further object of the invention to provide a traction mat with body segments having a plurality of raised projections, possessing a substantially high coefficient of static friction, extending outwardly from the upper surface of each body segment for frictional engagement with a vehicle tire.

It is still another object of the invention to provide a traction mat with earth engaging cleats that may be readily changed to match the existing conditions.

It is still a further object of the invention to provide a traction mat that may be conveniently utilized as a road hazard warning marker in addition to providing an artificial surface for allowing vehicles to extract themselves from miring conditions.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

DETAILED DESCRIPTION OF A PREFERRED EMBODIMENT

Referring now to FIGS. 1 through 4 the invention is designated generally as 10 and consists of four major panels 12,14,16 and 18. Each panel is pivotally attached to the adjoining panel by means of apertured ears 20 operatively mating with the apertured body member of the adjoining panel 22. In the case of panels and 14 and panels 16 and 18 a permanently installed pin 24 joins the operative parts whereby they become articulating. Panels 14 and 16 are connected by a pin 26 which is removable and threaded on both ends 28 to accept wing nuts 30. Braces 32 are mounted on either side of the panel junction and serve to support the panels transversely when the invention is used as a road way hazard warning marker. The apertures 34 engage pin 26 and are secured in place by wing nuts 30. Braces 32 include outwardly extending feet 36 to increase the efficiency of the braces when used in the upstanding position. The braces may remain on the mat or may be removed and only installed when used as a roadway hazard warning marker.

The panels include a planar surface 38 which contains a plurality of raised projections 40 having a high coefficient of friction, which form a rectangular cavity with a top surface which is raised at the ends 42,44 and depressed in the midsection of the long sides 46. The panels include side rails 48 and 50 which add stability to the relatively thin panel members. Side rails 50 taper at the end to facilitate installation of the mat under the wheels of deeply mired vehicles.

Figures 1, 2:
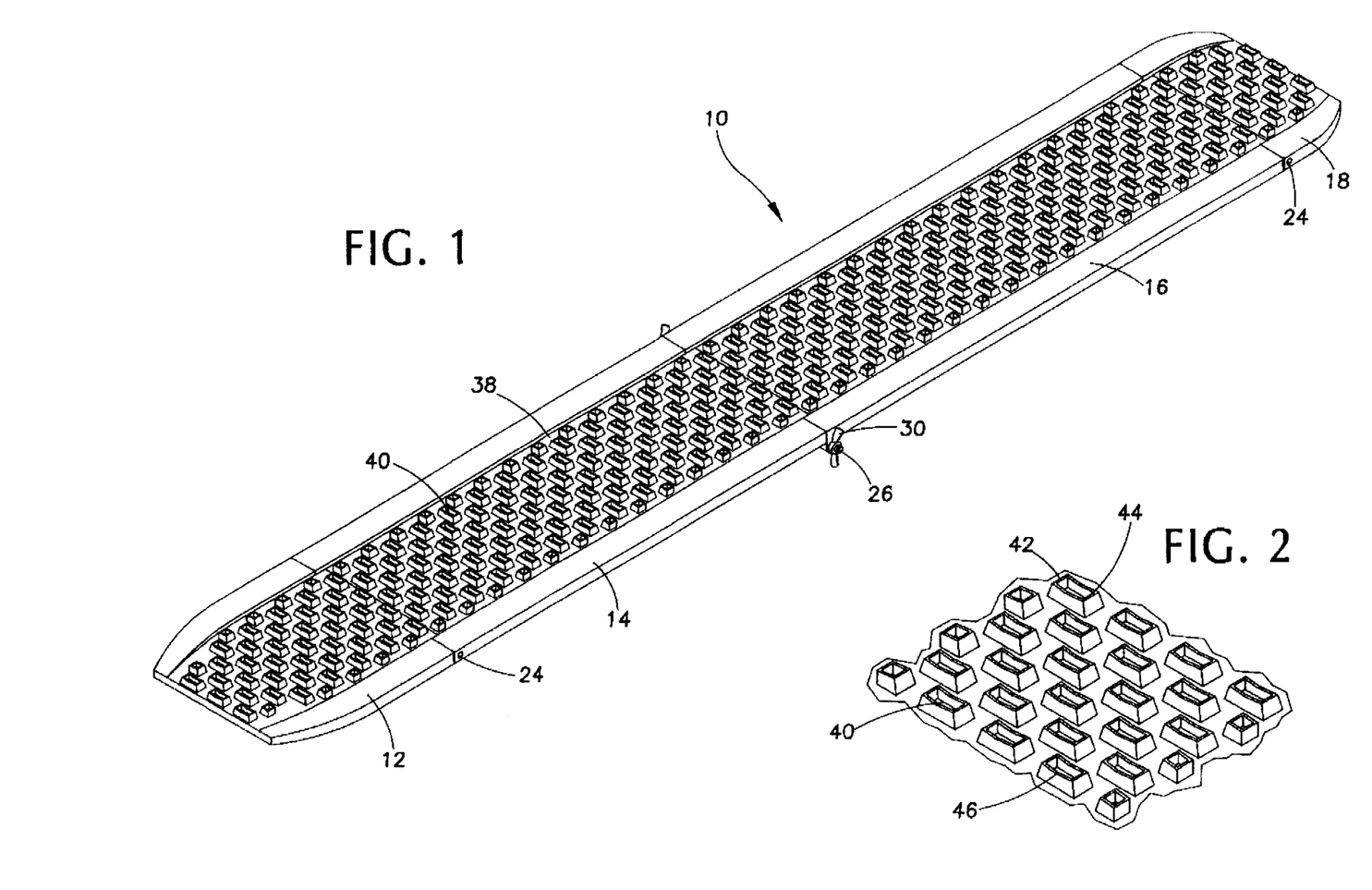
FIG. 1 is a perspective view of the invention.
FIG. 2 is an enlarged section of the top friction surface.
Figure 3:
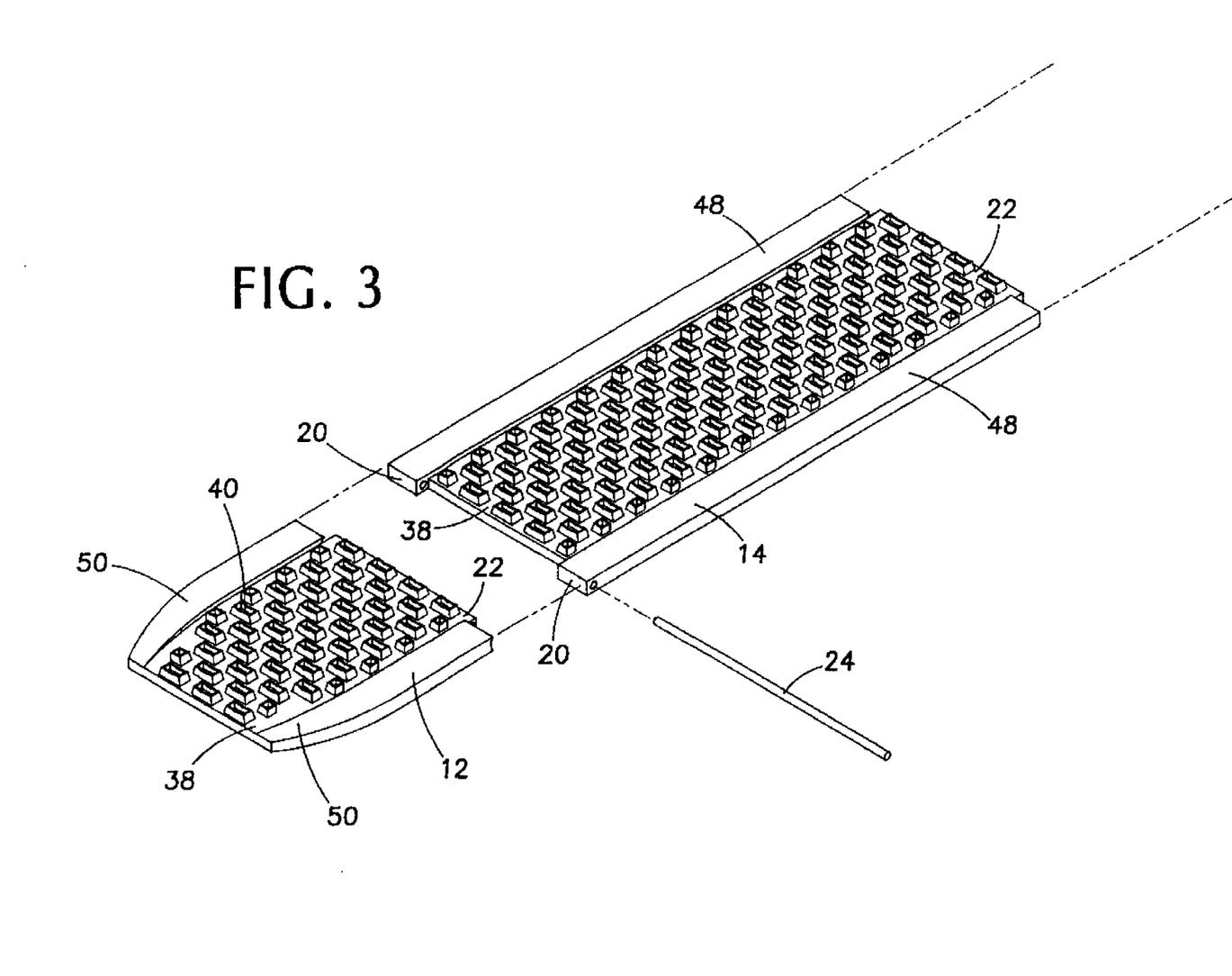
FIG. 3 is an exploded view of one half the invention.
Figure 4:
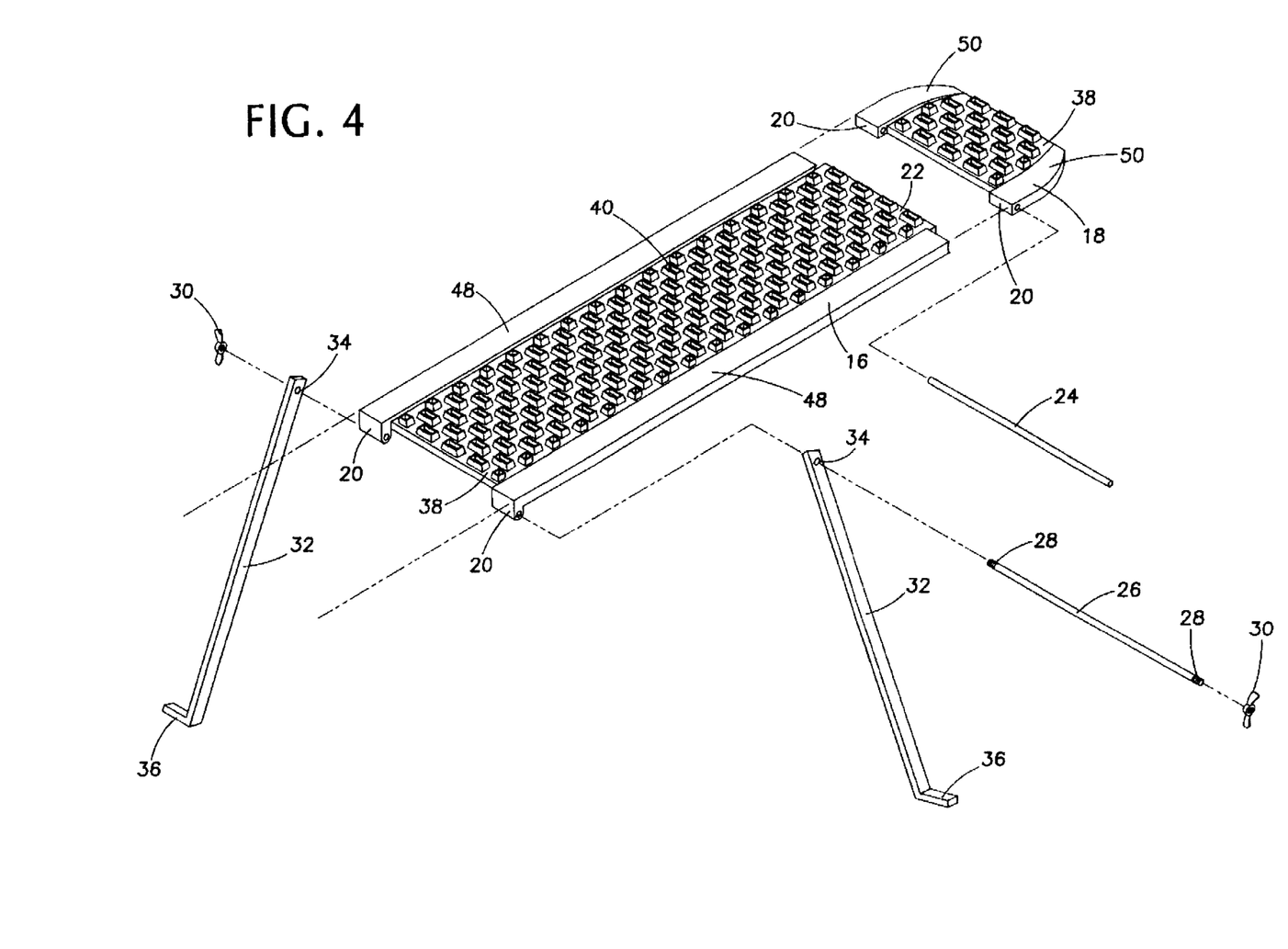
FIG. 4 is an exploded view of another half of the invention.
Figure 5:
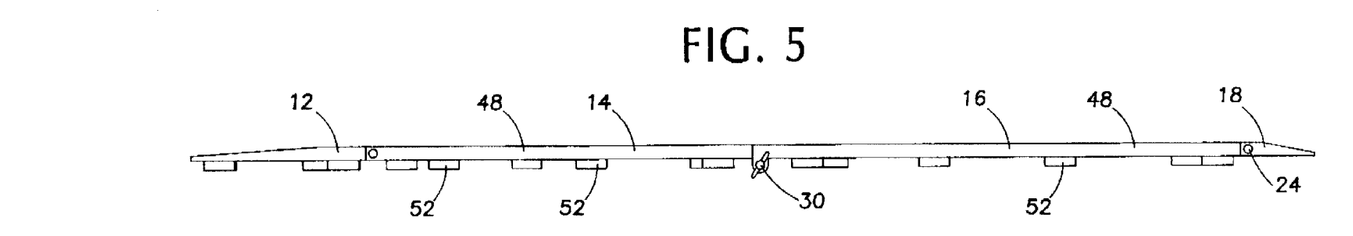
FIG. 5 is a side elevation view of the invention.
Figures 6, 7:
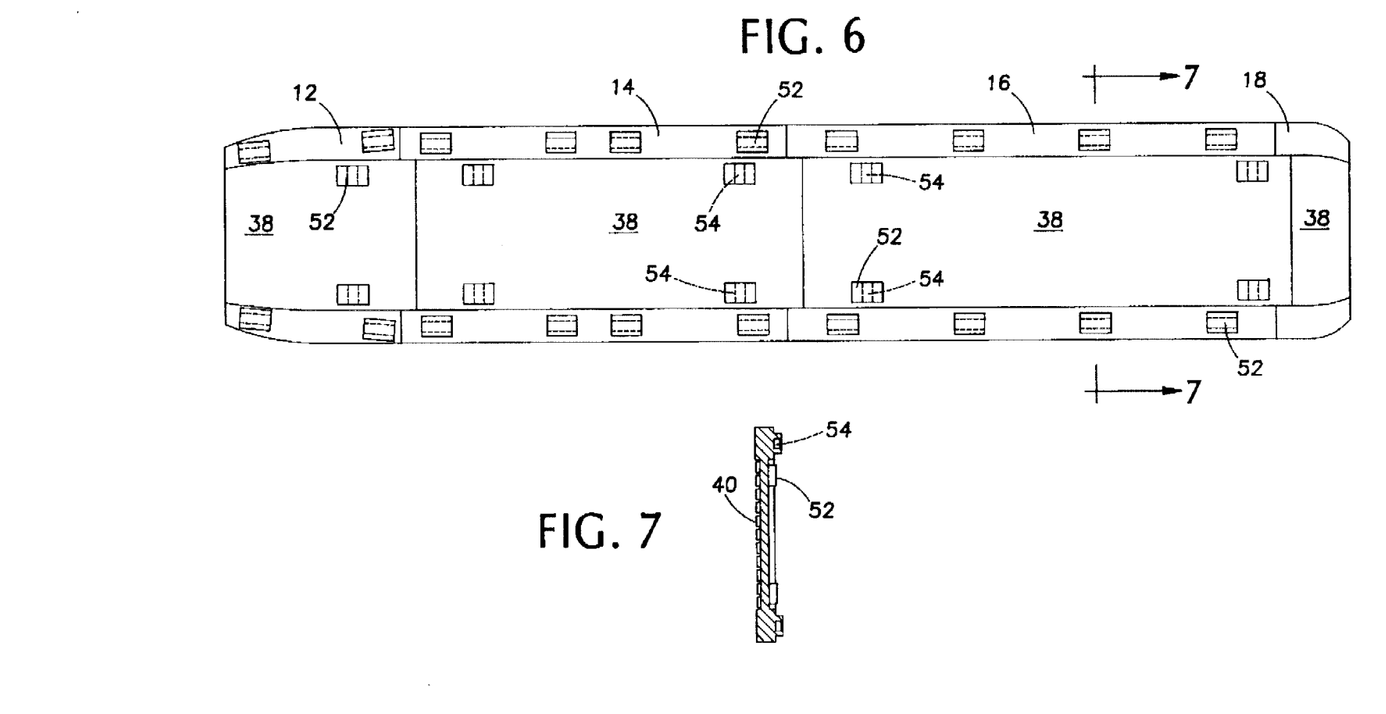
FIG. 6 is a bottom plan view of the invention.
FIG. 7 is a cross sectional view of the invention taken along lines 7—7 of FIG. 6.
Figure 8:
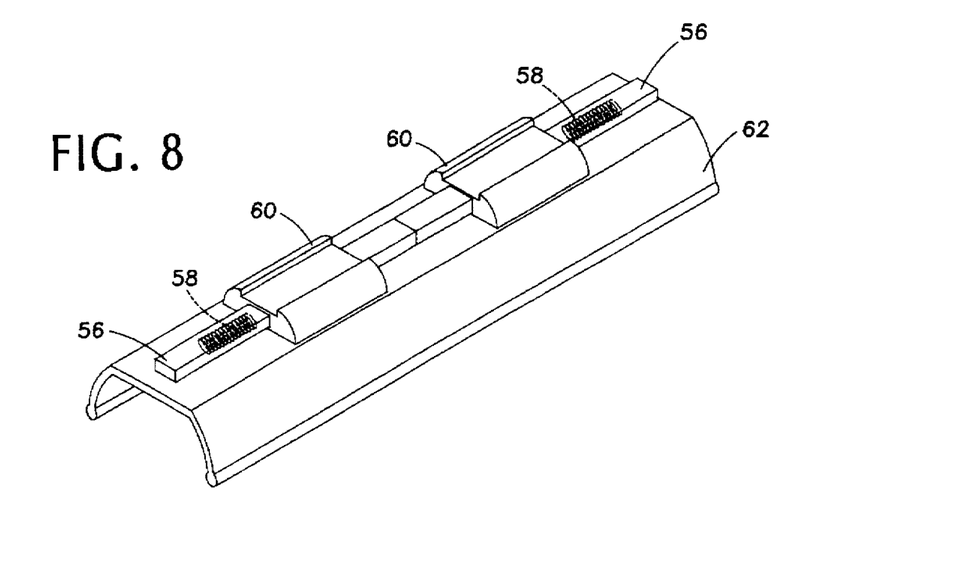
FIG. 8 is a perspective view of one form of cleat for the invention.
Figure 9:
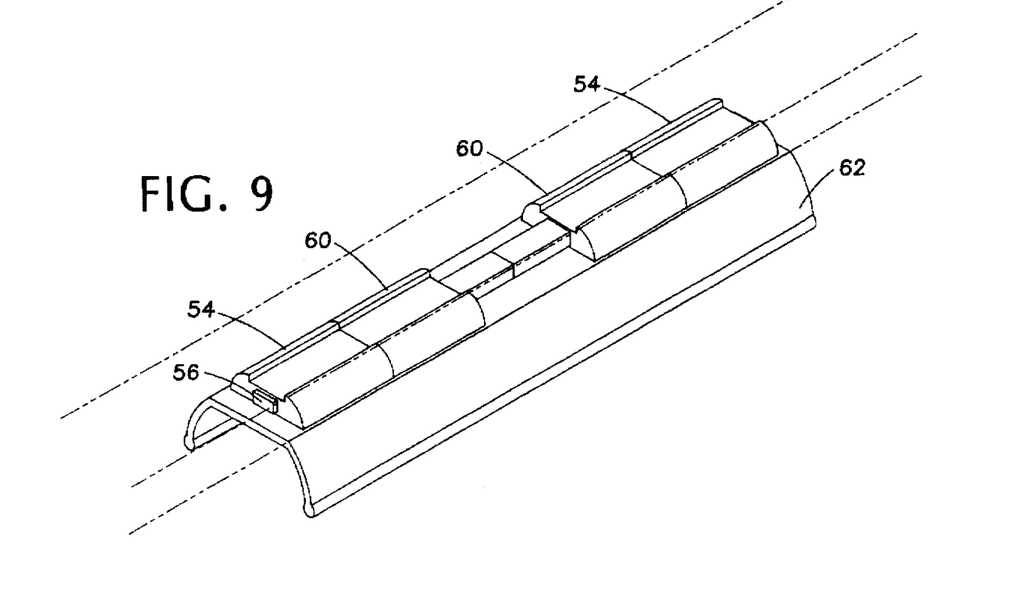
FIG. 9 is a perspective view of the cleat of FIG. 8 installed on the bottom of the invention.
Figure 10:
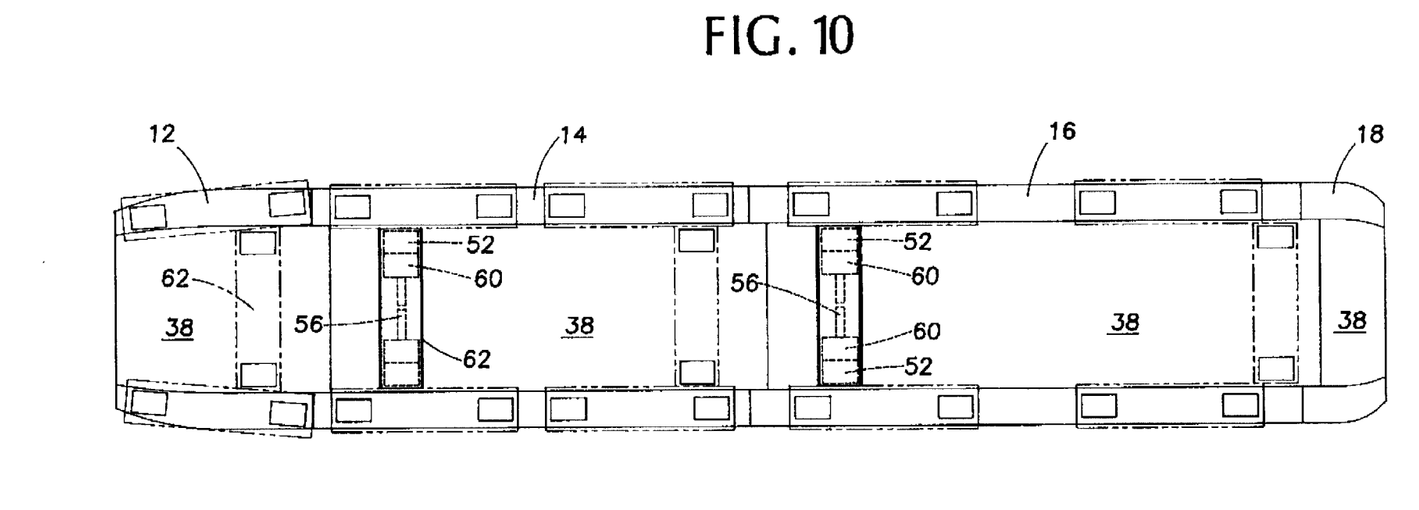
FIG. 10 is a bottom plan view showing cleats installed on the invention.

FIG. 5 shows a right side elevation view of the invention with the braces removed, Viewing side rails 48 shows the addition of connecting fastener 52 on the bottom of the panel. The connecting members 52 provide a point of attachment for the ground gripping cleats not shown in the figure. The end panels are also sloping toward the distal edge to allow the mat to slip farther under the tire. One end panel 50 is shorter than the opposed end panel to allow the invention more versatility in different situations.

Figure 11A:
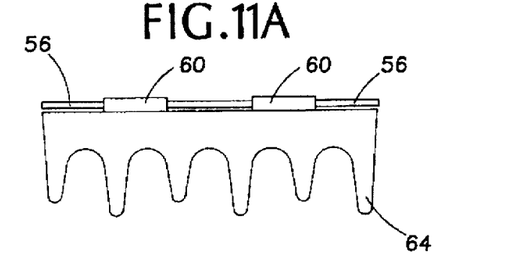
FIGS. 11A, 11B and 11C are assorted forms of earth gripping cleats used with the invention.
Figure 11B:
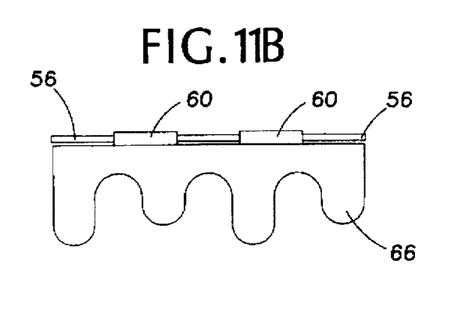
Figure 11C:
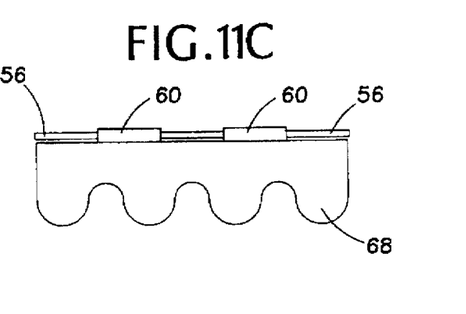

Concerning FIGS. 6 through 10 and FIGS. 11A, 11B and 11C, the bottom side of panels 12,14,16 and 18 is shown including alternative cleat attachments. Affixed to and forming part of the panel are connecting fasteners 52 which contain throughgoing apertures 54. The fasteners 52 are sized and spaced to accept lock bars 56 which are outwardly biased by springs 58 and attached to the cleat fasteners 60 which are attached to the particular form of cleat 62 used for the particular ground condition. The lock bar 56 is moved toward the center of the cleat and installed between the fasteners 52 mounted on the bottom of the mat. As the fastener 60 is installed, the lock bar will move under the bias of the internal springs 58 and the bars will slide into the apertures 54 in the fasteners 52. To remove the particular cleat 62 the lock bar 56 is moved in, against the bias of the spring and the cleat will be free to be removed. FIGS. 11A, 11B and 11C show cleats 64,66 and 68 that may be used for gripping slippery surfaces such as ice, snow and unconsolidated soils.

Figure 12:
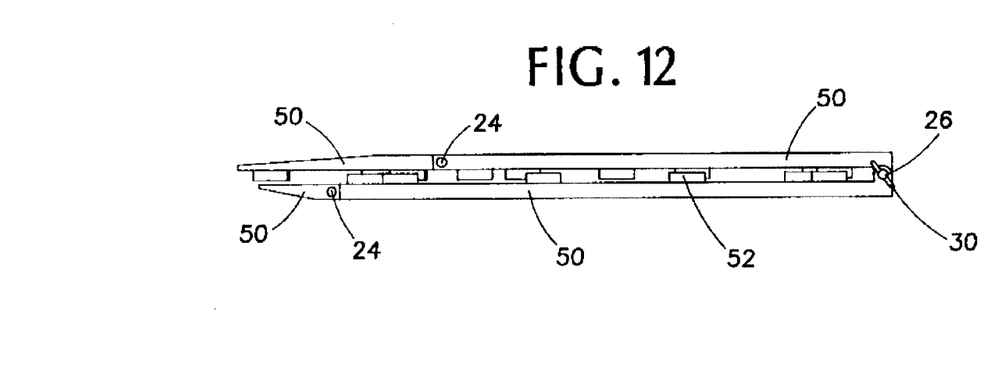
FIG. 12 is a side elevation view of the invention in the folded condition.

FIG. 12, shows the invention in a storage condition where the top panels are hidden between the side rails 48,50 and the bottom fasteners 52 are spaced in a manner that the panels will fold over and the fasteners on one panel will not interfere with the panels on the opposed panel.

Figure 13:
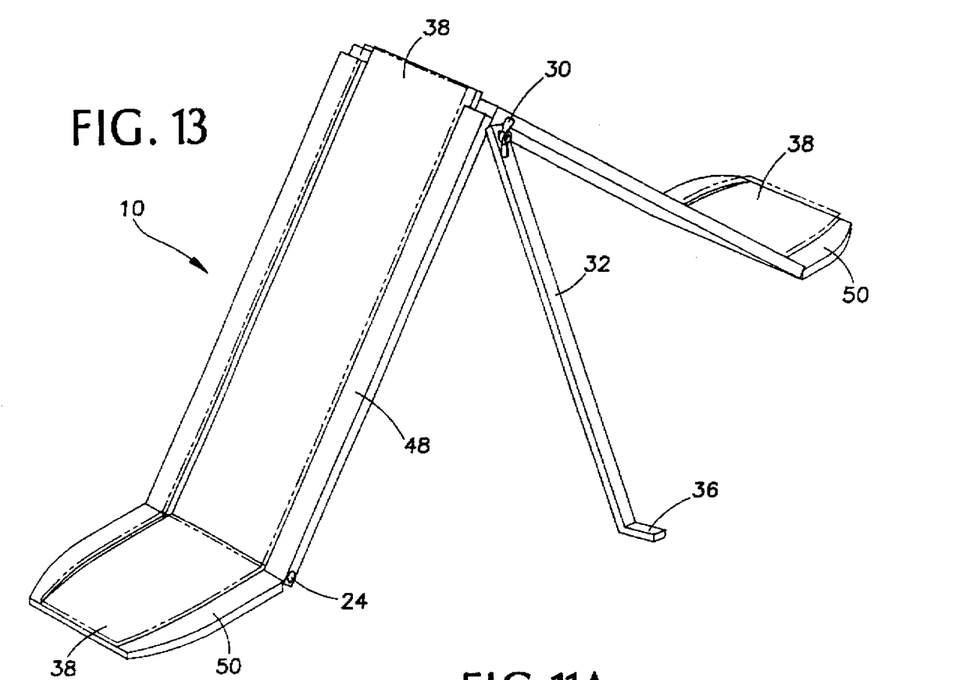
FIG. 13 is a perspective view of the invention utilized in the hazard warning mode.

In FIG. 13 the mat 10 is folded in an upright position with panel 38 and side rails 48 standing generally upright and supported by braces 32 which provide lateral support and are connected to rod 26 by wing nuts 30. Feet 36 at the distal end of the brace give added support and stability to the structure. The entire face of the mat is formed of a bright color such as international orange while the side rails and braces are covered with a reflective coating that may also contain some abrasive material The bright color is intended primarily for daylight use, while the reflective coating is intended for use during the hours of darkness. The entire mat is colored and covered so that in use it is immaterial which panel of the mat is exposed to on coming traffic.

What is claimed is:

1. A vehicle traction mat comprising:

a substantially rectangular body formed of a single row of hinged panel segments for providing the body with articulated adjustability;

the panel segments at each end of the mat are shorter in length than the panel segments between the end panel segments;

one of the end panel segments is shorter in length than the opposed end panel segment;

the end panel segments are reduced in thickness from an articulated end to a distal end;

the end panel segments are reduced in width from the articulated end to the distal end;

the panel segments are so connected that one half of the mat is capable of folding over a remaining half without interference;

a plurality of raised rectangular projections having a high coefficient of friction extending from an upper surface of each panel segment for frictional engagement with a vehicle tire;

said raised projections form a cavity;

the top of a long side of the raised projections are high at an end and depressed in a top mid-section;

parallel tire rails extending above and below the panel segments for providing strength to the panel segments;

a plurality of fastener means, affixed to a bottom surface of each panel segment;

a plurality of cleat means adapted to releasably engage said fastener means for securing the panel segments on a slippery or unstable surface; and bracing arms attached to a mid-point of the mat for supporting the mat in an upright position; and the side rails and bracing arms are covered with light reflecting material.

2. A vehicle traction mat comprising:

a substantially rectangular body formed of a single row of hinged panel segments for providing the body with articulated adjustability;

the panel segments at each end of the mat are shorter in length than the panel segments between the end panel segments;

one of the end panel segments is shorter in length than the opposed end panel segment;

the end panel segments are reduced in thickness from an articulated end to a distal end;

the end panel segments are reduced in width from the articulated end to the distal end;

the panel segments are so connected that one half of the mat is capable of folding over a remaining half without interference;

a plurality of raised rectangular projections having a high coefficient of friction extending from an upper surface of each panel segment for frictional engagement with a vehicle tire;

said raised projections form a cavity;

the top of a long side of the raised projections are high at an end and depressed in a top mid-section;

parallel tire rails extending above and below the panel segments for providing strength to the panel segments;

a plurality of fastener means, affixed to a bottom surface of each panel segment; and a plurality of cleat means adapted to releasably engage said fastener means for securing the panel segments on a slippery or unstable surface; and bracing arms attached to a mid-point of the mat for supporting the mat in an upright position 3. A vehicle traction mat as described in claim 2 wherein the fastener means further comprise:

a first fastener member attached to the panel segments; and a first aperture in the first fastener member.

4. A vehicle traction mat as described in claim 3 wherein the cleat means further comprise:

a cleat member;

a second fastener member attached to the cleat member;

a second aperture in the second fastener member a spring in the second aperture;

a lock bar in the second aperture; and the spring biasing a portion of the lock bar out of the second aperture and into the first aperture when the second fastener member is aligned with the first aperture in the first fastener member.

* * * * *